March 1, 1927.

A. E. L. CHORLTON 1,619,701

VARIABLE SPEED GEAR AND MEANS FOR CONTROLLING THE SAME

Filed July 7, 1924   5 Sheets-Sheet 1

INVENTOR.

BY A. E. L. Chorlton,
Watson, Coit, Morse & Grindle,
ATTYS.

March 1, 1927.
A. E. L. CHORLTON
1,619,701
VARIABLE SPEED GEAR AND MEANS FOR CONTROLLING THE SAME
Filed July 7, 1924     5 Sheets-Sheet 4
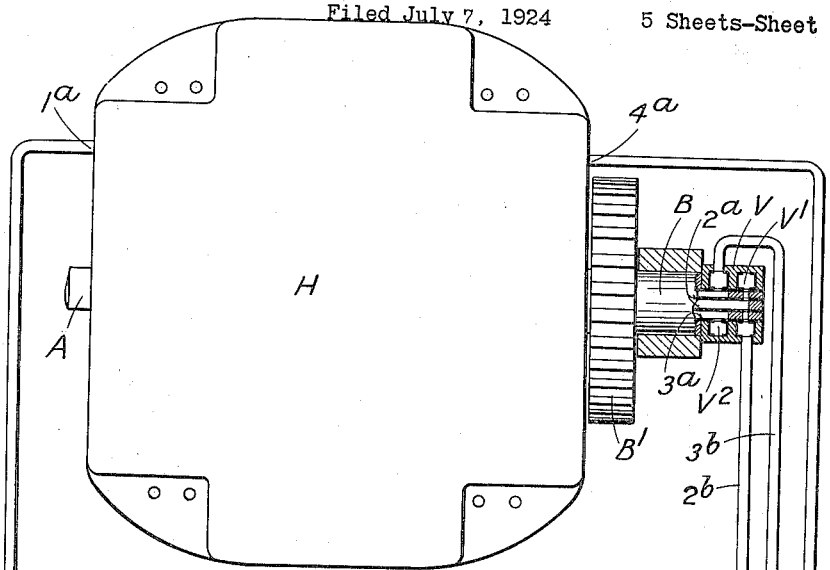
FIG. 5.
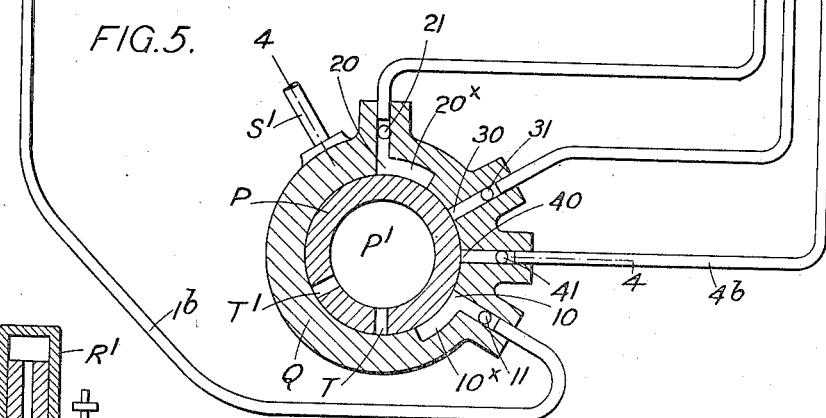
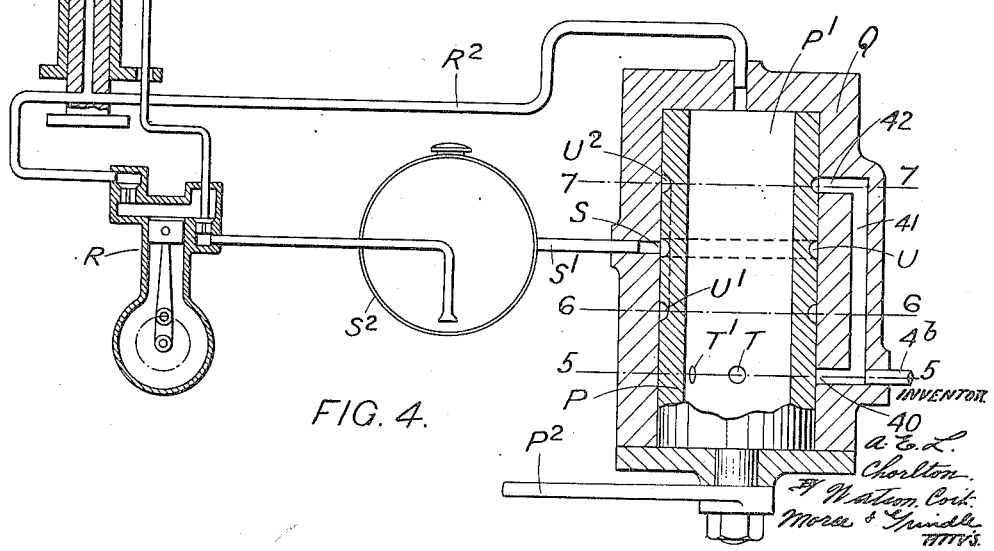
FIG. 4.

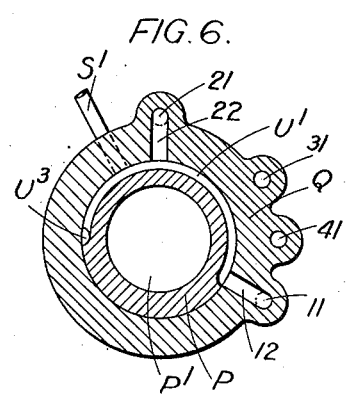
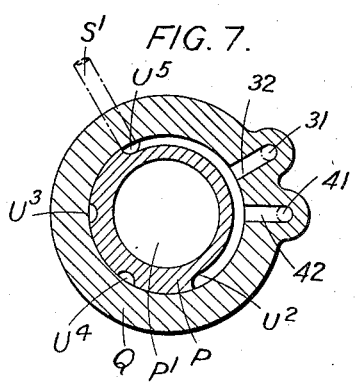
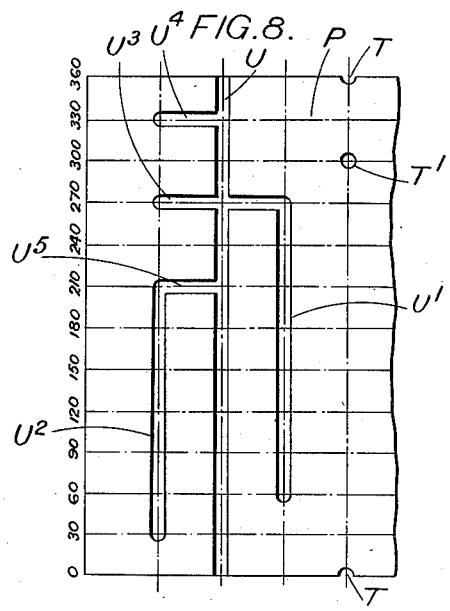
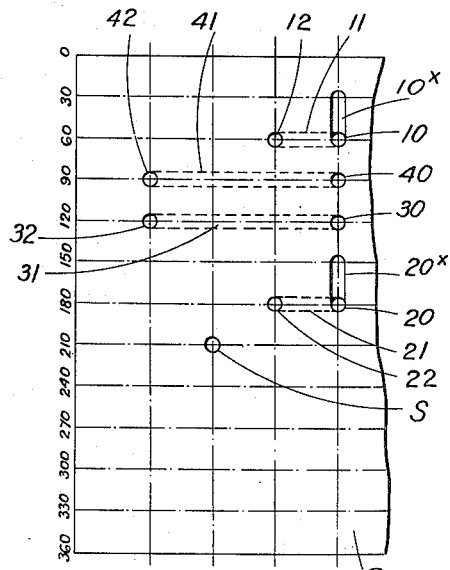

Patented Mar. 1, 1927.

1,619,701

UNITED STATES PATENT OFFICE.

ALAN ERNEST LEOFRIC CHORLTON, OF LONDON, ENGLAND.

VARIABLE SPEED GEAR AND MEANS FOR CONTROLLING THE SAME.

Application filed July 7, 1924. Serial No. 724,719.

This invention relates to variable speed gears more especially those of the spur wheel epicyclic type and to the means whereby such gears may be controlled.

Where it is necessary to use a variable speed gear in a power transmission system comprising a prime mover of considerable horse power, as for instance in the case of an internal combustion engine locomotive, the forces developed are such that it is not practicable to employ constructions of speed gear and methods of controlling the same such as would be possible where less horse power is being transmitted. It has been found necessary to employ for this purpose a gear of the spur wheel epicyclic type, but whereas it has been customary to control the speed variations in such gears by band brakes, cone clutches and such like devices in cases where relatively a small horse power has had to be transmitted through the gear, the employment of these devices is impracticable with a prime mover developing, for example, 1000 or 1500 horse power which has to be transmitted to track wheels through the variable gear. It becomes necessary then to provide some means by which, while the desired range of speeds may be obtained, the speed changes may be carried out and controlled in a manner which will give in effect a considerable range in transmission ratios without risk of such shocks or strains as would be liable to cause damage to the transmission mechanism.

According to this invention this end is attained by employing connecting devices of the plate type which are operative on the elements of the gear train so as to bring about all the speed variations while, further, these connecting devices are controlled in such a manner as to effect their engagement and release and permit a variable degree of slip between the clutch members. This control is conveniently effected by fluid means. Thus while the gear train may be constructed to provide certain definite transmission ratios, it is possible to vary these while the drive is being transmitted by slipping of the several connecting devices to a variable extent so that any change from one fixed gear ratio to another may be carried out gradually without shock to the mechanism.

A further feature in the invention is the provision of a gear structure particularly suited for use in this way the gear structure comprising one or more epicyclic gear trains. Such gear structure is also combined with plate connecting devices specially suited for use in the manner indicated.

The invention also relates to the means by which these connecting devices may be operated and controlled.

The accompanying drawings illustrate by way of example structures of variable speed gear, connecting devices and means for controlling the same such as may be employed in putting the invention into practice. In these drawings all of which are of a diagrammatic nature:—

Figure 4 shows in longitudinal section a construction of control valve and the mechanism for supplying liquid under pressure to the several connecting devices in the construction of gear illustrated in Figure 2.

Figure 5 is a transverse section on the line 5—5 through the control valve shown in Figure 4 together with the pipe connections for conveying liquid under pressure to the connecting devices in the gear shown in Figure 2 and for relieving the pressure from these connecting devices.

Figure 6 is a transverse section on the line 6—6 through the control valve shown in Figure 4.

Figure 7 is a similar section taken on the line 7—7 through the control valve shown in Figure 4.

Figure 8 is a projection on the flat of the external surface of the valve shown in Figure 4 illustrating the arrangement of the passages and ports in this valve.

Figure 9 is a similar projection on the flat of the interior surface of the valve body shown in Figure 4 illustrating the disposition of the ports and passages in this body.

Like letters indicate like parts throughout the drawings.

Figure 1:
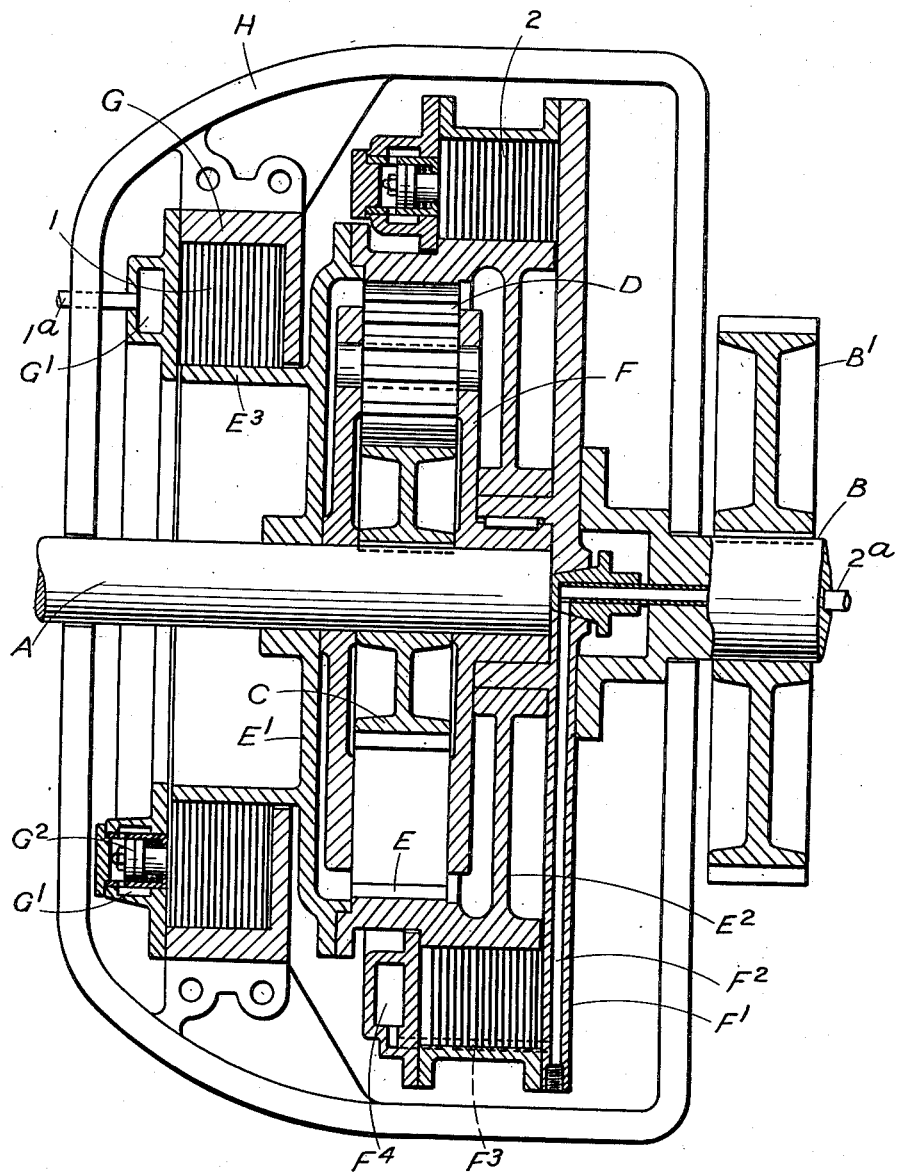
Figure 1 is a longitudinal sectional elevation illustrating by way of example one form of single epicyclic gear train as constructed, arranged and adapted to be controlled to enable speed variations to be obtained in accordance with this invention.

Referring first to the single gear train illustrated in Figure 1, the driving shaft A is disposed coaxially with the driven shaft B power being applied from some suitable prime mover to the shaft A while the shaft B is coupled to or provided with some convenient means for driving the mechanism to which power is to be transmitted through the gear. For example, a gear wheel B' may be mounted on the shaft B and the drive taken from this wheel thus leaving clear the end of the shaft so as to permit of conveying through it in the manner described hereunder liquid under pressure for controlling one or more connecting devices. On the shaft A is fixed a sun wheel C which meshes with a series of planet wheels D conveniently three in number and disposed at equal distances apart around the sun wheel C. Around the planet wheels D and meshing with them lies an internally toothed annulus E. The planet wheels D are carried by a disc member F which can rotate on the inner end of the driving shaft A this member F being rigidly connected to a disc F' which in turn is coupled rigidly to the end of the driven shaft B so that the latter shaft rotates as one with the parts F F' as the planet wheels D move around the sun wheel C. The annulus E is carried by inwardly directed flanges or discs E' E² provided with suitable bearings so that the annulus is free to rotate about the driving shaft A. The disc E' carries on a cylindrical part or lateral flange E³ plates forming one member of a plate connecting device the other plate members of this clutch being fixed in an annular chamber G suitably disposed within a casing H enclosing the whole gear. This connecting device which, for convenience, will be referred to as connecting device No. 1, enables the toothed annulus E to be held against rotation when desired. The connecting device is adapted to be controlled by liquid pressure the liquid being delivered through a pipe 1ª into an annular chamber G' where it can act on a series of plungers such as G² through which pressure can be applied to the plates of the connecting device 1 so as to cause engagement between the parts of the connecting device. Coiled springs cause the return movement of the plungers G² when the liquid pressure is relieved. The liquid pressure is so controllable that the pressure on the connecting device plates can be applied to a variable degree and correspondingly relieved as desired, thereby enabling the connecting devices to be brought into engagement gradaully with a variable degree of slip between them and released in a similar manner as required. By thus permitting slip between the members of the connecting device and bringing them into gradual engagement as the liquid pressure on the connecting device members is increased, shocks and undue strains on the mechanism are avoided while, moreover, the slipping of the connecting device provides in effect an increased range of the speed ratios obtainable with the gear.

The disc member E² of the toothed annulus E carries at its peripheral part the plates forming one member of a connecting device 2 of which the other member is carried by the disc F'. This connecting device 2 serves to couple together the toothed annulus E and the rotatable member F F' which carries the planet wheels D and is in turn coupled to the driven shaft B. The connecting device 2 is constructed and controlled by liquid pressure in a manner similar to the clutch 1 so that the connecting device 2 can be applied or released gradually with a varying degree of slip. The liquid for controlling the connecting device 2 is delivered through a pipe 2ª which passes down the center of the driven shaft B and communicates with a radial passage F² formed within the disc F² whence a passage F³ leads to an annular chamber F⁴ wherein are a series of plungers adapted to act on the plates of the connecting device as in the case of the connecting device No. 1.

In this construction if both connecting devices 1 and 2 are released, the driving shaft A will rotate the sun wheel C without effect on the driven shaft B. If the connecting device 1 is engaged, thereby holding the toothed annulus E against rotation, the shaft B will be driven at a reduced speed. By slipping of the connecting device 1 and bringing the members into gradual engagement, the speed ratio can be varied up to the fixed ratio determined by the dimensions of the gear wheels. Hence with a constantly rotating driving shaft A it becomes possible to bring the fixed gear ratio into operation gradually by the slipping of the members of connecting device 1 and in this way shock to and undue straining of the mechanism may be avoided. If the connecting device No. 1 is released and connecting device No. 2 is engaged, a direct drive will be obtained, the shaft B being rotated at the same speed as the driving shaft A. Reduction of the gear ratio gradually so as to culminate in this direct drive is possible by the slipping and gradaul engagement of the members of the connecting device 2.

Thus by means of the above described mechanism, it is possible to transmit the drive from the shaft A to the shaft B by such graduations as will have substantially the effect of an infinite range of gear ratios leading up to the fixed ratio of the wheels and thence to the direct drive.

Figure 2:
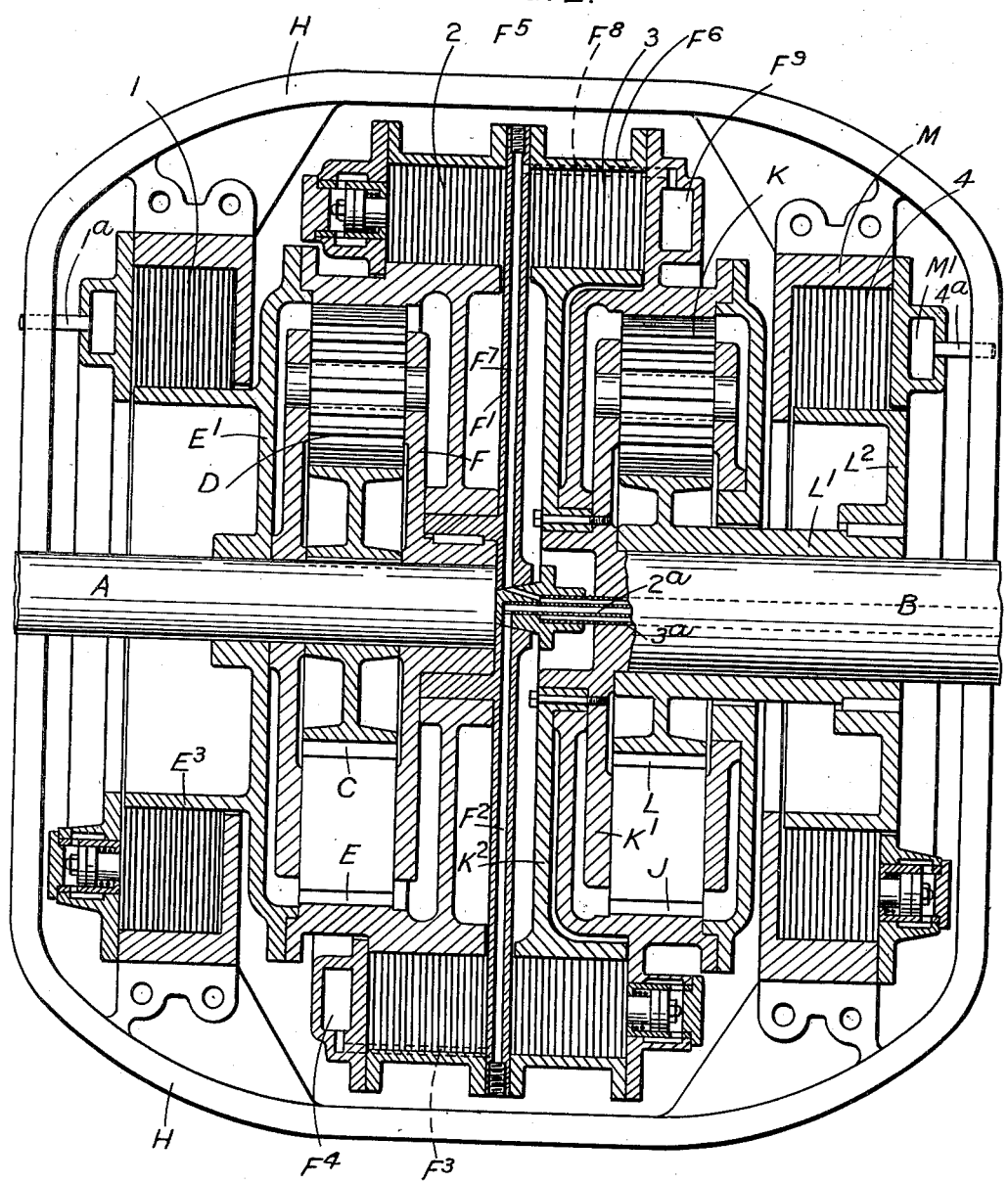
Figure 2 is a similar view of one form of variable speed gear comprising two epicyclic gear trains with connecting devices for controlling them.

Referring to the variable speed gear illustrated in Figure 2, this comprises in effect a gear train similar to that shown in Figure 1 combined with a second and substantially similar gear train through which the drive is transmitted from the driving shaft A to the driven shaft B. The parts comprising the first gear train shown in the left-hand portion of Figure 2 are constructed and arranged in substantially the same way as the gear train illustrated in Figure 1. There is a sun wheel C fixed on the driving shaft A and this sun wheel meshes with a series of planet wheels D disposed around it. These planet wheels in turn mesh with an internally toothed annulus E which is mounted loosely about the shaft A. A plate connecting device 1 comprising members respectively carried on the casing H which encloses the whole gear and on a part such as a flange $E^3$ on the disc E' connected to the annulus E serves to enable this annulus to be held against rotation. A plate connecting device 2 whose members are respectively carried by the annulus E and by the rotatable member F F' which in turn carries the planet wheels D enables the toothed annulus to be coupled to the planet wheel carrier. In this case, however, this planet wheel carrier F F' is not coupled directly to the end of the driven shaft B but is connected to the internally toothed annulus J of the second gear train. The member F F' also carries the plates forming one member of another plate connecting device 3. As shown, the connecting devices 2 and 3 are conveniently disposed on either side of the disc F' being arranged in annular chambers $F^5$ $F^6$, the toothed annulus J being mounted on the chamber $F^6$. The planet wheels K of the second gear train are mounted on a disc or the like K' fixed on the inner end of the driven shaft B and to this planet-carrying member K' is connected a flanged disk $K^2$ on the flange of which are mounted the plates forming the second member of the connecting device 3. The planet wheels K mesh on the one hand with the toothed annulus J and on the other hand with a sun wheel L mounted loosely on the driven shaft B. The sun wheel L is disposed on a sleeve L' having a flanged disc member $L^2$ which carries plates forming one member of a connecting device 4. The plates forming the other member of this connecting device are fixed in a chamber M mounted rigidly in the casing H.

Connecting device 1 serves to hold against rotation the toothed annulus E of the first gear train. Connecting device 2 serves to couple the toothed annulus E to the rotatable member F F' which carries both the planet wheels D of the first gear train and the toothed annulus J of the second gear train. Connecting device 3 serves to couple the rotatable member F F' with the planet wheels D and the toothed annulus J to the driven shaft B. Connecting device 4 serves to hold the sun wheel L against rotation. All these connecting devices are controlled by liquid pressure the liquid being delivered to connecting device 1 through the pipe $1^a$ which leads out through the casing H. The liquid flows to and from the connecting devices 2 and 3 through concentric pipes $2^a$ and $3^a$ which run through a passage within the driven shaft B. At their inner ends these pipes terminate in the centre of and rotate with the disc F' the pipe $2^a$ leading to a radial passage $F^2$ whence the liquid can flow in the axial direction through a passage $F^3$ into the annular chamber $F^4$ where it can act on plungers operative on the plates of the connecting device 2 in the same way as described with reference to the operation of connecting device No. 1 in the construction shown in Figure 1. The pipe $3^a$ leads into a radial passage $F^7$ which communicates in turn by a passage $F^8$ extending in the axial direction with an annular chamber $F^9$. The pressure of the liquid in this chamber can act through a series of plungers on the plates of the connecting device 3. The liquid under pressure is conveyed to the connecting device No. 4 through a pipe $4^a$ which leads through the casing H into an annular chamber M' fixed in this casing where the liquid pressure can act through a series of plungers on the connecting device plates.

If all the connecting devices are disengaged, the driving shaft A can rotate without transmitting any power to the shaft B. If it is desired to bring the lowest gear ratio into operation, connecting devices 1 and 4 are engaged, the engagement in the case of either one or both of these connecting devices being gradual, such variable slip being permitted as the pressure increases as will cause the fixed gear ratio to be reached smoothly and without undue shock or strain on the mechanism. By the engagement of connecting devices 1 and 4, the toothed annulus E in the first gear train and the sun wheel L in the second gear train are held against rotation. At this time the connecting devices 2 and 3 are disengaged.

In order to pass to the next gear ratio, connecting device 1 is still maintained engaged but connecting device 4 is released so as to free the sun wheel L and connecting device 3 is gradually engaged. In this way, while the toothed annulus E is still held against rotation, the member F F' which carries the planet wheels D in the first gear train is coupled to the driven shaft B, the members of the second gear train then being inoperative.

The next step in the fixed gear ratios is brought about by releasing the connecting devices 1 and 3 and gradually engaging the connecting devices 2 and 4, thus coupling the toothed annulus E to the rotatable member F F' and holding the sun wheel L against rotation.

If a direct drive is desired, connecting devices 2 and 3 are engaged while connecting devices 1 and 4 are released. The toothed annulus E will then be coupled to the member F F' which carries the planet wheels D this member in turn being coupled to the driven shaft B. The gear wheels in the two trains will then be locked together and to the driving and driven shafts.

Figure 3:
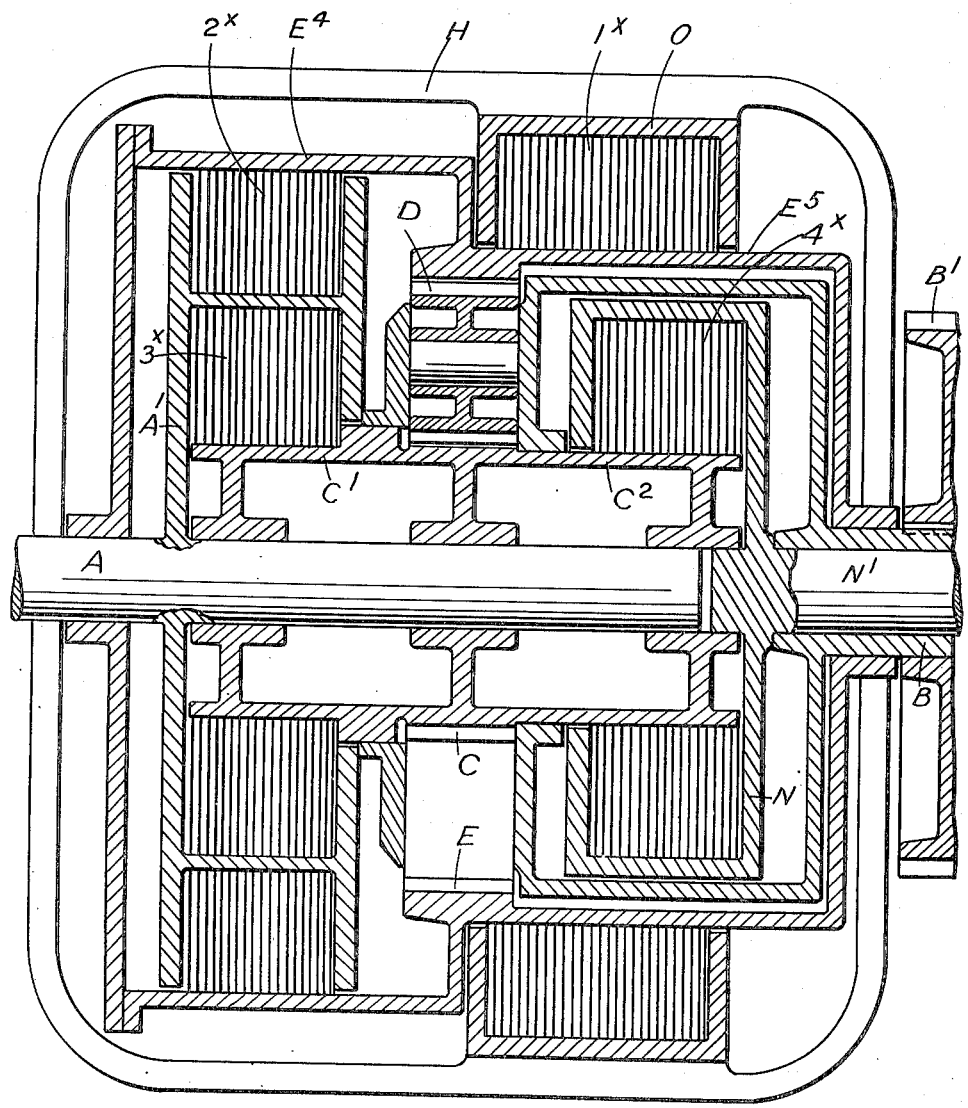
Figure 3 is again a similar view illustrating an alternative arrangement of a single epicyclic gear train embodying the invention.

Turning now to the construction shown in Figure 3, this illustrates an alternative arrangement for a single gear train. As in the case of the single gear train shown in Figure 1, that illustrated in Figure 3 comprises a sun wheel C which, however, in this instance is carried loosely on the driving shaft A, a series of planet wheels D which are positively connected to the driven shaft B, and an internally toothed annulus E. In place of the single gear train being controlled by two connecting devices, as in the construction shown in Figure 1, the gear shown in Figure 3 is controlled by four connecting devices of the plate type each of which is actuated by liquid pressure so that the connecting device members can be brought into or out of engagement with a variable degree of slip between them. As mentioned, the sun wheel C is in this case losely mounted but can be coupled to the driving shaft A or, alternately, held against rotation. By this means it is possible to obtain two alternative fixed gear ratios in addition to a direct drive, whereas with the single gear train shown in Figure 1, only one fixed gear ratio and a direct drive is obtainable as is apparent from the description above.

The details of the construction shown diagrammatically in Figure 3 are as follows: The sun wheel C is mounted about the centre of the length of a sleeve member C' C² which can rotate freely on the driving shaft A. That part C' of this sleeve which is directed towards the end of the driving shaft A to which the power is applied carries the plates forming one member of the connecting device 3ˣ. The other plate member of this connecting device is carried by a disc A' fixed on the driving shaft A. The other part C² of the sleeve which carries the sun wheel C surrounds the inner end of the driving shaft A and carries the plates forming one member of the connecting device 4ˣ.

The other plate member of this connecting device is mounted in an annular chamber on a disc N fixed on a shaft N' which passes out through the hollow driven shaft B and is held against rotation. The connecting device 3ˣ thus enables the sun wheel to be coupled to the driving shaft A while the connecting device 4ˣ enables this sun wheel to be held against rotation.

The internally toothed anulus E is mounted about the centre of the length of a cylindrical member E⁴ E⁵, the ends of which are provided with suitably arranged disc-like bearing members rotatable respectively on the driving shaft A and on the driven shaft B. On the part E⁴ of this cylindrical member are mounted the plates forming one member of the connecting device 2ˣ, the other member of this connecting device being mounted on the disc A' of the driving shaft A. On the part E⁵ of the cylindrical member are mounted plates forming one member of the connecting device 1ˣ the plates forming the other member of this connecting device being disposed in an annular chamber O which is fixed within the casing H enclosing the whole gear. The connecting device 2ˣ enables the toothed annulus E to be coupled to the driving shaft A while the connecting device 1ˣ enables this annulus to be held against rotation.

When it is desired to bring into operation the first fixed gear ratio, connecting devices 1ˣ and 3ˣ are engaged whereby the sun wheel C will be coupled to the driving shaft A and the annulus E will be held against rotation. This has therefore substantially the same effect as engaging the connecting device 1 in the gear mechanism shown in Figure 1.

When it is desired to bring the second fixed gear ratio into operation, connecting devices 1ˣ and 3ˣ are released and connecting devices 2ˣ and 4ˣ are engaged. This results in the toothed annulus E being coupled to the driving shaft A while the sun wheel C is held against rotation. In each of these cases, the drive is taken off through the planet wheels D and the driven shaft B.

When it is desired to obtain a direct drive, connecting devices 2ˣ and 3ˣ are engaged, thereby coupling both the sun wheel C and the annulus E to the driving shaft A so that the whole gear rotates solid.

The several connecting devices are controlled by liquid under pressure in such a way that the plates can be brought gradually into engagement or disengaged with a variable degree of slip so that in effect an infinite range of gear ratios can be obtained between the fixed ratios determined by the dimensions of the several gear wheels.

Figures 4 to 9 illustrate by way of example one method of controlling the connecting devices in the gear construction shown in Figure 2, so as to bring these connecting devices into operation or release them in their proper sequence.

The flow of liquid under pressure is controlled by a hollow cylindrical valve P which is rotatable within a cylindrical valve body or casing Q. Liquid under pressure is delivered by a pump R into an accumulator R' whence it flows through a pipe R² into the end of the casing Q, the liquid then having access to the interior P' of the hollow valve P, as shown in Figure 4. A port S in the casing Q communicates by a pipe S' with a chamber S² whence the liquid is drawn by the pump R. Thus the liquid supplied under pressure flows through the pipe R² into the interior P' of the valve P and after passing to the several clutches returns through the relief port S to the chamber S² when the pressure on the clutches is relieved. The valve P can be rotated within the valve body Q by means of a lever P² adapted to be operated by hand or by other means.

The arrangement of the ports and passages in the valve body Q and in the valve P is shown in Figures 8 and 9. Taking first the casing Q, it will be seen that the pipes 1ᵇ, 2ᵇ, 3ᵇ, 4ᵇ leading from the several connecting devices 1, 2, 3 and 4 are carried to the casing Q and terminate in the cylindrical interior of this casing in corresponding ports 10, 20, 30 and 40, as shown in Figure 9. These ports, however, are arranged in the order 10, 40, 30, 20 around the interior of the casing Q. The port 40 is spaced 30° apart from the port 10, while there is a similar circumferential distance between the ports 30 and 40, but there is double the distance, namely 60° of arc, between the ports 30 and 20. There extends, however, from the port 20 towards the port 30 for a distance of 30° of arc a groove 20ˣ, while a similar circumferential groove 10ˣ of like length, namely 30° of arc, extends from the port 10 in the direction of the port 20. The relief port S is positioned in the circumferential direction 30° of arc from the port 20 but is not in line therewith, being placed further along the casing Q. On the other hand, the port 10 with its groove 10ˣ, the ports 40 and 30 and the port 20 with its groove 20ˣ are all in line, that is, in the same plane normal to the valve axis, as shown in Figure 9. From each of these ports there extend in the longitudinal direction of the casing Q passages which terminate respectively in other ports. Thus from the port 10 there runs a by-pass passage 11 which terminates in a port 12. From the port 40 there runs a by-pass passage 41 which terminates in a port 42. The by-pass passage 41 extends in the longitudinal direction for a distance three times the length of the by-pass passage 11. From the port 30 a by-pass passage 31 leads to a port 32, the passage 31 being the same length as the by-pass passage 41. Finally, from the port 20 a by-pass passage 21 having the same length as the passage 11 leads to a port 22. The ports 12 and 22 lie in one plane normal to the valve axis, while the ports 32 and 42 lie in one plane normal to the valve axis. The relief port S lies in a similar plane which is situated midway in the direction of the valve axis between the plane in which lie the ports 32 and 42 and the plane in which lie the ports 12 and 22.

Turning now to the formation of the exterior of the valve P as shown in Figure 8, it will be seen that this has formed in it two ports T and T' which pass through the valve body into its interior P'. These ports are situated in the same plane normal to the valve axis and this plane is disposed so as to coincide with the plane in which lie the ports 10, 20, 30 and 40 formed in the valve casing Q. The exterior surface of the valve P has formed in it a series of grooves which extend both circumferentially and longitudinally as indicated in Figure 8. The principal one of these grooves U runs the whole way round the valve in a plane adapted to coincide with the relief port S in the casing Q. Spaced equally apart from, in the longitudinal direction, and extending circumferentially in planes situated on either side of the groove U are two other grooves U' and U². The groove U' runs for a distance of 210° of arc around the valve while the groove U² runs for a distance of 180° of arc around the valve. At one end, the groove U' communicates with the groove U by a groove U³ which runs in the longitudinal direction at right angles to the groove U', the groove U³, however, being carried beyond the groove U so that the end of the groove U³ will terminate in the same plane normal to the valve axis as that in which lies the groove U². Another and shorter longitudinal groove U⁴ extends from the groove U and terminates in the same plane as lie the end of the groove U³ and the circumferential groove U². The groove U² is connected at that end thereof which is adjacent to the end of the groove U³ by a longitudinal groove U⁵ which runs into the groove U.

The control of the several connecting devices in the mechanism illustrated in Figure 2 is brought about by operation of the above described valve mechanism in the following way: In the position in which the valve is shown in Figure 5 with the pressure delivering ports T T' closed, the pressure is relieved from all the connecting devices so that the gear will be inoperative and no power will be transmitted from the driving shaft A to the driven shaft B. If now the valve P is rotated by means of the lever P² so as to bring the ports T T' into register with the end of the groove 10ˣ communicating with the port 10 and the port 40, liquid under pressure from the interior P' of the valve can flow through the pipes 1ᵇ 1ᵃ and 4ᵇ 4ᵃ to the connecting devices 1 and 4, thus bringing into operation the first gear. At this time the pipes 2ᵇ and 3ᵇ will be open to relief since the ports 20 and 30 are in communication with the groove U whence the pressure can be relieved by way of the relief port S. If the valve is now turned through 30° of arc the port T will be brought into register with the port 30, the port 40 now being closed. The port T' will, however, still allow liquid under pressure to flow into the pipe 1ᵇ by reason of the circumferential spacing apart of the ports T T' and the provision of the groove 10ˣ communicating with the port 10. Pressure will now be applied through the pipe connections 3ᵃ 3ᵇ to the connecting device 3 which will be in operation together with the connecting device 1, thus briging into use the second gear. At this time the pressure will be relieved from the connecting devices 2 and 4. Further rotation of the valve P through 30° of arc will bring the port T into register with the end of the groove 20ˣ while the port T' will register with the port 40. Pressure will now be admitted by the pipes 2ᵇ 2ᵃ and 4ᵇ 4ᵃ to the connecting devices 2 and 4, thus bringing into operation the third gear. At this time the pressure will be relieved from the connecting devices 1 and 3. Finally, if the valve is turned through a further 30° of arc so as to bring the port T opposite the port 20 and the port T' into register with the port 30, pressure will be applied to the connecting devices 2 and 3 while the pressure will be relieved from connecting devices 1 and 4, the result being a direct drive.

The pipes 2ᵃ and 3ᵃ rotate with the disc member F' to which one end of each of these concentric pipes is connneced. The outer ends of these pipes 2ᵃ and 3ᵃ extend beyond the outer end of the driven shaft B into a fixed member V shown in Figure 5. The ends of the pipes can rotate in this fixed member in which are formed annular chambers V' and V² whence lead the pipes 2ᵇ and 3ᵇ respectively. The liquid under pressure supplied through these pipes 2ᵇ and 3ᵇ can pass from the annular chambers V' and V² through openings in the walls of the tubes 2ᵃ and 3ᵃ into these tubes passing thence to the passages F² and F⁷.

Apparatus of a type similar to that described above may be employed for controlling the supply of liquid under pressure to and relieving this pressure from the several connecting devices in the gears illustrated in Figures 1 and 3 and this controlling mechanism in the case of either of the gear constructions shown may be actuated by various means. It will be appreciated that by suitable movements of the controlling valve the pressures as applied to the several connecting devices may be adjusted as required so as to permit various degrees of slip.

The details of construction may be modified as found necessary in accordance with the purpose for which the improved gear is employed.

What I claim as my invention and desire to secure by Letters Patent is:—

1. In a variable speed gear, in combination, a driving member, a driven member, means for coupling said driving member to said driven member including an epicyclic gear train comprising a sun wheel loosely mounted concentrically of the driving member, a rotatable arm carrying a planetary pinion connected to the driven shaft, a toothed annulus concentric with the driving and driven members but mounted to rotate independently of either, a disc secured to the driving shaft, a plurality of multiple plate connecting devices operative on the elements of the gear train for changing the speed ratio between the driving and driven members, there being two of said multiple plate connecting devices adapted to hold the sun gear and annulus stationary, and two multiple connecting devices adapted to connect the sun gear and annulus to said disc secured to the driving shaft, and means for controlling said connecting devices.

2. In a variable speed gear, in combination, a driving member, a driven member, means for coupling said driving member to said driven member including two epicyclic gear trains, each comprising a sun wheel, a rotatable arm carrying a planetary pinion, and a toothed annulus, the sun wheel of the first gear train being secured to the driving member, the rotatable arm of the first train being secured to the annulus of the second, and the rotatable arm of the second gear train being secured to the driven member, a plurality of multiple plate connecting devices operative on the annulus of the first train and on the sun wheel of the second train for changing the speed ratio of the gear, and means for controlling said connecting devices, said means being adapted to permit a variable degree of slip between the plates of the connecting devices.

3. In a variable speed gear, in combination, a driving member, a driven member, means for coupling said driving member to said driven member including two epicyclic gear trains, each comprising a sun wheel, a rotatable arm carrying a planetary pinion, and a toothed annulus, the sun wheel of the first gear train being secured to the driving member, the rotatable arm of the first train being secured to the annulus of the second, and the rotatable arm of the second gear train being secured to the driven member, a multiple plate connecting device adapted to hold the annulus of the first gear train stationary, a second multiple plate connecting device adapted to lock the elements of the first train together, a third connecting device adapted to lock the elements of the second train together, a fourth connecting device adapted to hold the sun wheel of the second train stationary, and means for controlling said connecting devices, said means being adapted to permit a variable degree of slip between the plates of the connecting devices.

In testimony whereof I have signed my name to this specification.

ALAN ERNEST LEOFRIC CHORLTON.